US012654322B2

(12) United States Patent
Izumi et al.

(10) Patent No.: US 12,654,322 B2
(45) Date of Patent: Jun. 16, 2026

(54) DELIVERY SYSTEM

(71) Applicant: TOYOTA JIDOSHA KABUSHIKI KAISHA, Aichi-ken (JP)

(72) Inventors: Takashi Izumi, Tokyo-to (JP); Tatsuya Tsubakimoto, Tokyo-to (JP); Uori Koike, Saitama (JP); Yuta Itozawa, Nagoya (JP); Satoshi Komamine, Nagoya (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 6 days.

(21) Appl. No.: 18/669,531

(22) Filed: May 21, 2024

(65) Prior Publication Data

US 2024/0399577 A1      Dec. 5, 2024

(30) Foreign Application Priority Data

May 31, 2023      (JP) ................................. 2023-090052

(51) Int. Cl.
*B25J 9/16* (2006.01)
*B25J 11/00* (2006.01)
(52) U.S. Cl.
CPC ........... *B25J 9/1666* (2013.01); *B25J 11/008* (2013.01)
(58) Field of Classification Search
None
See application file for complete search history.

(56) References Cited

U.S. PATENT DOCUMENTS

| | | | |
|---|---|---|---|
| 2015/0046018 A1 | 2/2015 | Hayashi et al. | |
| 2020/0327768 A1* | 10/2020 | Rossano | B25J 19/06 |
| 2022/0105854 A1 | 4/2022 | Matsushita et al. | |

(Continued)

FOREIGN PATENT DOCUMENTS

| | | | | |
|---|---|---|---|---|
| CN | 110422529 B | * | 5/2021 | B65G 1/1373 |
| JP | 2011-105469 A | | 6/2011 | |

(Continued)

OTHER PUBLICATIONS

English translation of WO-2020228266-A1 (wherein the paragraph numbering provided coincides with any relevant citations to this reference within the accompanying Office Action) (Year: 2020).*

(Continued)

*Primary Examiner* — Jason Holloway
*Assistant Examiner* — Bryant Tang
(74) *Attorney, Agent, or Firm* — HAUPTMAN HAM, LLP

(57) ABSTRACT

To provide a delivery system or the like adapted to request a person to remove an obstacle in a given area in front of a storage cabinet. A delivery system includes: a storage cabinet; a delivery robot capable of traveling to the storage cabinet and delivering an article; at least one detection unit configured to detect an obstacle present in the vicinity of the storage cabinet; and a control unit configured to control an operation of the delivery system, including the delivery robot. When the detection unit detects that there is an obstacle within a given area in the vicinity of the storage cabinet, and when the control unit determines that the delivery robot cannot deliver the article to the storage cabinet due to the presence of the obstacle, the control unit sends a notification requesting that the detected obstacle be removed from the given area.

4 Claims, 6 Drawing Sheets

(56)            References Cited

U.S. PATENT DOCUMENTS

2022/0221870 A1 *   7/2022   Zimmermann ...... B25J 11/0005
2023/0311760 A1 *   10/2023   Hara ..................... B60W 50/12
                                                    701/96

FOREIGN PATENT DOCUMENTS

JP          2015035139  A        2/2015
JP          2022-061816 A        4/2022
JP          2022123953  A        8/2022
JP          2022-181531 A        12/2022
RU          2673857  C1  *  11/2018   .............. A47L 11/14
WO      WO-2020228266 A1  *  11/2020   ............... B25J 9/16

OTHER PUBLICATIONS

English translation of CN-110422529-B (wherein the paragraph numbering provided coincides with any relevant citations to this reference within the accompanying Office Action) (Year: 2021).*
English translation of RU-2673857-C1 (wherein the paragraph numbering provided coincides with any relevant citations to this reference within the accompanying Office Action) (Year: 2018).*

* cited by examiner

DELIVERY SYSTEM

CROSS REFERENCE TO RELATED APPLICATIONS

This application is based upon and claims the benefit of priority from Japanese patent application No. 2023-090052, filed on May 31, 2023, the disclosure of which is incorporated herein in its entirety by reference.

BACKGROUND

The present disclosure relates to a delivery system.

Japanese Unexamined Patent Application Publication No. 2022-061816 discloses a technique in which a vehicle such as an automated guided vehicle (AGV) stores a package in a locker when the package is delivered to the locker of an end user.

SUMMARY

For a delivery robot to store an article in a storage cabinet, it must stop in a given area in the vicinity of the storage cabinet. However, if an obstacle exists within the given area in the vicinity of the storage cabinet, the delivery robot may not be able to stop within the given area in the vicinity of the storage cabinet. In such a case, the delivery robot cannot execute the operation of storing the article in the storage cabinet.

The present disclosure has been made in view of such problem and provides a delivery system by which a request can be made to a human to remove an obstacle from a given area in front of a storage cabinet.

According to an aspect of the present disclosure, a delivery system includes:
a storage cabinet;
a delivery robot capable of traveling to the storage cabinet and delivering an article thereto;
at least one detection unit configured to detect an obstacle present in the vicinity of the storage cabinet; and
a control unit configured to control an operation of the delivery system, including the delivery robot,
in which
when the detection unit detects that there is an obstacle within a given area in the vicinity of the storage cabinet, and when the control unit determines that the delivery robot cannot deliver the article to the storage cabinet due to the presence of the obstacle, the control unit sends a notification requesting that the detected obstacle be removed from the given area.

According to the present disclosure, a delivery system and the like can be provided by which a request can be made to a human to remove an obstacle from a given area in front of a storage cabinet.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Specific embodiments to which the present disclosure is applied will now be described in detail with reference to the drawings. However, the present disclosure is not limited to the following embodiments. In addition, for clarity of explanation, the following description and drawings are simplified as appropriate.

First Embodiment

Hereinafter, a delivery system according to a first embodiment will be described with reference to the drawings.

Figure 1:
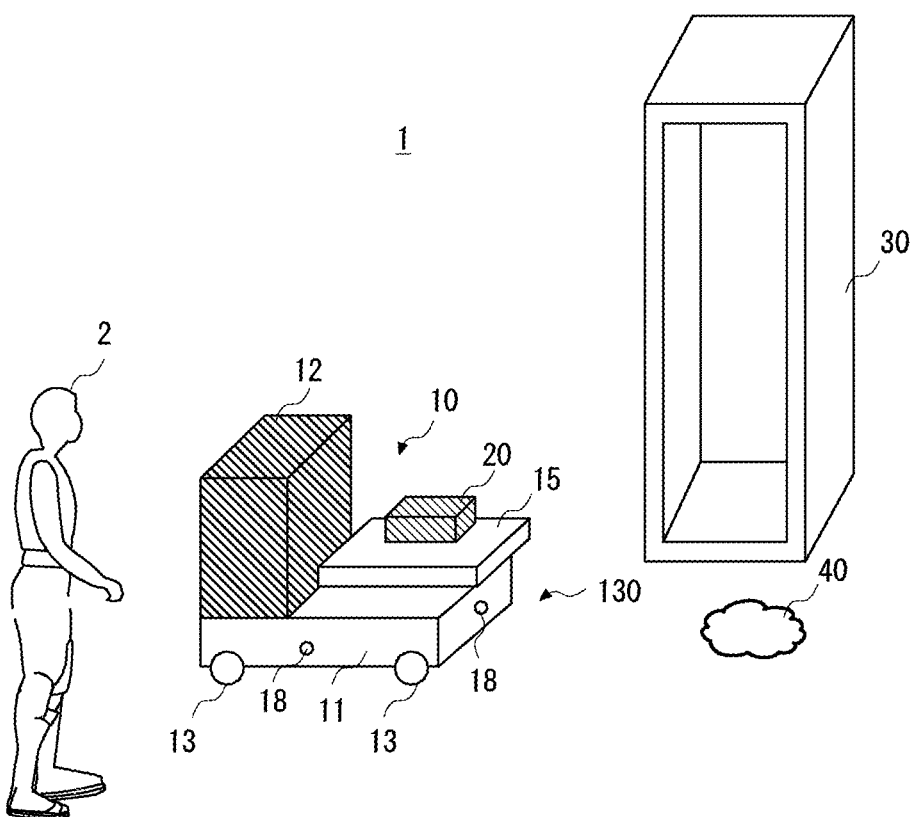
FIG. 1 is a schematic perspective view illustrating a delivery system according to a first embodiment.

FIG. 1 is a schematic perspective view illustrating an outline of a delivery system 1. The delivery system 1 can be used for the last mile in logistics, i.e., logistics services from the final hub to the end user. The delivery system 1 includes a delivery robot 10 and a storage cabinet 30. The storage cabinet 30, also known as a smart post, can complete a delivery operation without a delivery robot having to hand-deliver the article to the end user. A storage cabinet can be installed in each room of a residential complex where an end user lives, for example. The resident (an end user) can access the article stored in the storage cabinet from inside the room where the storage cabinet is installed and can place an article in the storage cabinet or take out an article from the storage cabinet from inside the room where the storage cabinet is installed.

The delivery robot 10 travels sequentially from one storage cabinet 30 to another storage cabinet 30 that are located at various places and stops in front of each of a plurality of the storage cabinets 30 to store articles 20 in the respective storage cabinets 30. This may also be referred to as delivery. Further, the delivery robot 10 travels sequentially from one storage cabinet 30 to another storage cabinet 30 that are located at various places and stops in front of each of a plurality of the storage cabinets 30 to take out articles 20 from the respective storage cabinets 30 and convey the articles 20 it has taken out. This may also be referred to as pick-up. The delivery robot 10 (or the storage cabinet 30) has a mechanism for delivering articles and picking-up articles via the storage cabinet 30. The delivery robot 10 is also equipped with various sensors, and detects human, storage cabinets, roads, and obstacles, and can travel autonomously. Any known object recognition technique can be utilized. The present disclosure proposes a delivery system by which a request can be made to a human to remove an obstacle present in the vicinity of a storage cabinet, if any.

The storage cabinet 30 may include a plurality of shelves (not shown) in which articles can be accommodated. The storage cabinet 30 may, for example, be located in front of each room of a building or a residential complex and has a door (not shown) in the front part thereof. The door may open automatically when the delivery robot 10 stops in front of the storage cabinet 30. The door may be, for example, a horizontally-openable shutter, a vertically-openable shutter, a single door, or a double door.

The delivery robot 10 includes: a base unit 11 including a plurality of wheels 13 (which may be collectively referred to as a dolly unit 130); a storage unit 12 provided on the base unit 11 in which a large number of articles 20 can be stored; and a loading platform 15 provided on the base unit 11 and on which the articles 20 are loaded. The base unit 11 may be a substantially rectangular elongated plate-like member. In addition, at any part of the delivery robot 10 (the base unit 11 in the present example), one or more sensors 18 are provided to detect or photograph an object or the like in omnidirection of the delivery robot and to detect the location of an obstacle on the road or the location of a storage cabinet. Each of the sensors 18 may be, for example, a camera. In some embodiments, delivery robots different from the delivery robot 10 such as a patrol robot 60 with a sensor (e.g., a sensor 18 such as a camera) that patrols the residential complex (see, FIG. 5), or a delivery robot with a sensor for performing delivery different from the delivery performed by the delivery robot 10 may be provided. The patrol robot 60 may, for example, travel through a passageway in a residential complex and monitor for obstacles on the passageway, etc. The patrol robot 60 may communicate monitoring information to the delivery robot 10 via a wireless network. In other embodiments, a fixed surveillance camera 70 (a sensor 18) (see FIGS. 4 and 5) may be installed in the vicinity of the storage cabinet 30 (for example, the ceiling of a passageway in a residential complex).

The loading platform 15 includes a mechanism for loading thereon an article 20 taken out from the storage unit 12 and placing the article 20 in the desired storage cabinet 30. Further, the loading platform 15 includes a telescopic arm (not shown) which can move up and down in the vertical direction and which can be expanded and contracted along the horizontal axis, and the telescopic arm can be moved forward, backward, to the left, and to the right. In some embodiments, the loading platform 15 can be configured to be rotatable with respect to the vertical axis. The loading platform 15 can also be configured to be omnidirectionally (360 degrees) movable with an article loaded thereon. However, as shown in FIG. 1, since the storage unit 12 is disposed on one side of the base unit 11, the loading platform 15 is prevented from moving to that side where the storage unit 12 is disposed (also referred to as the rear side herein). The delivery robot 10 is used to deliver articles to the storage cabinet 30 and pick up articles from it, but it does not have a mechanism for removing obstacles from a given area in front of the storage cabinet 30. Therefore, to remove an obstacle from a given area in front of a storage cabinet, help from a human may be necessary.

The delivery system 1 may be provided with a management server (not shown) for controlling the traveling of the delivery robot 10. In this case, the management server includes a control unit 100 connected to a delivery robot via a network. In another embodiment, the functions of the control unit of the management server and the functions of the control unit of the delivery robot can be decentralized to realize the present disclosure.

Figure 2:
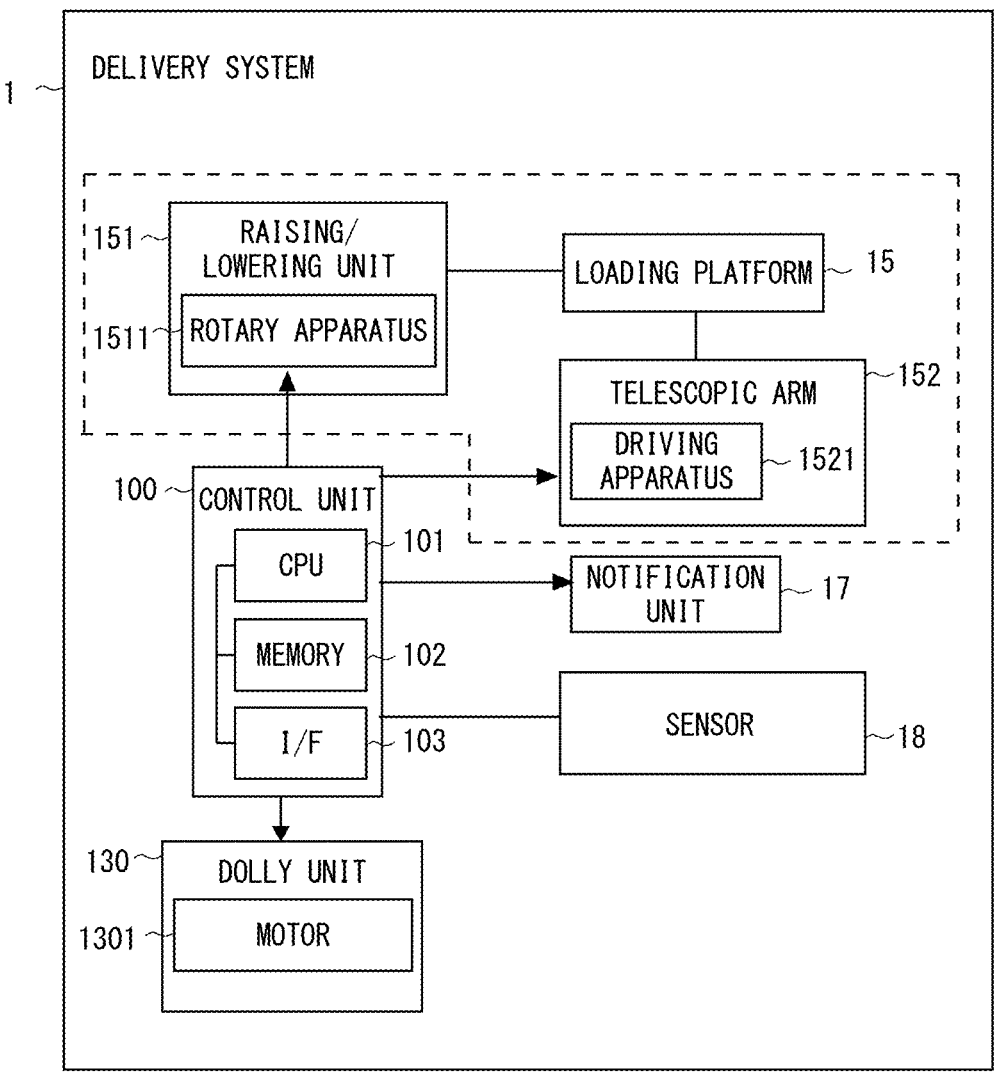
FIG. 2 is a block diagram illustrating the functions of the delivery system according to the first embodiment.

FIG. 2 is a block diagram illustrating the functions of a delivery system. The delivery system 1 includes the control unit 100. The control unit 100 may be provided in the delivery robot 10 or a management server. The control unit

100 receives a sensor signal from a sensor 18 connected by a wired or wireless network and controls the normal operation of the delivery system such as the dolly unit 130, a raising/lowering unit 151, and a telescopic arm 152 upon reception of the sensor signal. The control unit 100 may also receive a sensor signal from the sensor 18 to send a notification of the presence of an obstacle via the network and via a notification unit 17. In some embodiments, the control unit 100 may control the operation of a door on the front part of a storage cabinet or the operation of a manipulator therefor.

As shown in FIG. 1, the dolly unit 130 includes the base unit 11, the driving wheels 13 rotatably provided on the base unit 11, and a motor 1301 (FIG. 2) that rotatably drives each of the driving wheels 13. The motor 1301 rotates the respective driving wheels 13 through a reduction gear or the like. The motor 1301 rotates the respective driving wheels 13 in response to a control signal from the control unit 100. The motor 1301 rotates and stops the respective driving wheels 13 in response to a control signal from the control unit 100, so that the base unit 11 can be made to travel to an arbitrary position and stopped. The configuration of the dolly unit 130 described is a mere example and is not limited thereto. For example, the dolly unit 130 may have any number of driving wheels and driven wheels, and any configuration can be applied thereto as long as the base unit 11 can be made to travel to an arbitrary position.

As the raising/lowering unit 151 expands and contracts along the vertical axis, the loading platform 15 moves up and down. The raising/lowering unit 151 includes a rotary apparatus 1511. The telescopic arm 152 is attached to the loading platform 15. The telescopic arm 152 includes an arm main body and a driving apparatus 1521. The driving apparatus 1521 is mounted inside the loading platform 15 (not shown) and is configured to move the arm main body horizontally. The driving apparatus 1521 may further include a mechanism for rotating the arm main body about an axis.

The sensor 18 is provided at any part of the delivery robot 10, including the dolly unit 130 and the like. The sensor 18, also referred to a detection unit, is, for example, a camera and can acquire a captured image. The sensor 18 can detect the presence of a passageway, an obstacle, human, a storage cabinet, etc. The sensor 18 may include a travel detection sensor for detecting traveling of the dolly unit 130 and a height detection sensor for detecting the height of the loading platform 15. In some embodiments, the sensor 18 may be attached to another patrol robot, rather than to a delivery robot, or may be fixed to a building, etc. Again, the sensor 18 may be connected to the control unit 100 of the delivery robot 10 via a wireless network.

The notification unit 17 may be a built-in speaker, a built-in monitor, and a lamp of the delivery robot, or a communication terminal belonging to a specific person (e.g., a passerby, a recipient, family members of the recipient, a caretaker, neighbors, etc.). The notification unit 17 is adapted to receive a control signal from the control unit 100 and send a notification of the presence of an obstacle detected by the sensor 18 and request that the detected obstacle be moved. For example, the built-in speaker of a delivery robot may be configured to send an audible notification of the presence of an obstacle and requesting that the obstacle be removed. The built-in monitor and the lamp of a delivery robot may be configured to send a visual notification of the presence of an obstacle and requesting that the obstacle be removed. A communication terminal may perform audible or visual notification of the presence of an obstacle and requesting that the obstacle be removed.

The control unit 100 controls the normal operation of the delivery system such as the dolly unit 130, the raising/lowering unit 151, and the telescopic arm 152. The control unit 100 can send a control signal to have the notification unit 17 send a notification to a specific person of the presence of an obstacle and requesting the specific person that the obstacle be removed. The control unit 100 can control the rotation of each of the driving wheels 13 and cause the base unit 11 to travel to an arbitrary position by sending a control signal to the respective motors 1301 of the dolly unit 130. The control unit 100 can change the height of the loading platform 15 by sending a control signal to the rotary apparatus 1511 of the raising/lowering unit 151. The control unit 100 can change the horizontal position of the arm main body by transmitting a control signal to the driving apparatus 1521 of the telescopic arm 152.

The control unit 100 may control traveling of the base unit 11 (the dolly unit 130) by performing a well-known control such as a feedback control, a robust control, and the like based on rotation information of the driving wheels 13 detected by a rotation sensor provided to the driving wheels 13. The control unit 100 may control the operation of the dolly unit 130, the raising/lowering unit 151, and the telescopic arm 152 based on information such as the distance information detected by a distance sensor such as a camera or an ultrasonic sensor provided in the base unit 11 and the map information of the traveling environment. The control unit 100 determines the location where the delivery robot stops and the orientation of the delivery robot when it stops relative to a storage cabinet based on the location of an obstacle detected by the camera and the location of the storage cabinet.

The control unit 100 includes, for example, a microcomputer consisting of a control program executed by a CPU (Central Processing Unit) 101 for performing control processing, arithmetic processing, etc., a memory 102 consisting of a ROM (Read Only Memory) storing arithmetic programs, etc., and an interface unit (I/F) 103 for inputting and outputting signals to and from the outside. The CPU 101, the memory 102, and the interface unit 103 are connected to each other via a data bus, etc.

In FIG. 1, there is an obstacle 40 in front of the storage cabinet 30. The control unit 100 of the delivery robot 10 detects the location of the obstacle 40 and the location of the storage cabinet 30 using the sensor 18. The control unit 100 cannot determine the location where the delivery robot stops and the orientation of the delivery robot when it stops relative to a storage cabinet based on the location of the obstacle that has been detected and the location of the storage cabinet. In this case, the control unit 100 detects a human 2 in the surrounding area through the sensor 18. The control unit 100 can send a control signal to the notification unit 17, such as a built-in speaker or a built-in monitor and a lamp, of the delivery robot 10, through the network to send a notification requesting the human 2 to remove the obstacle 40. In this case, the control unit 100 may determine that the obstacle 40 will be removed by the human 2 in a short period of time and put the delivery robot 10 on standby at the current location.

Figure 3:
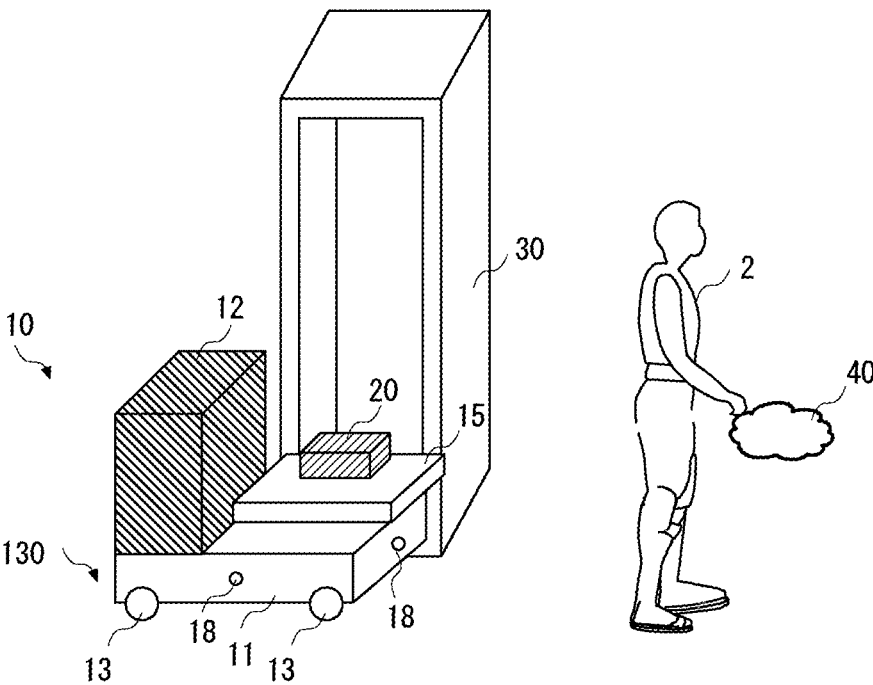
FIG. 3 is a perspective view illustrating delivery performed by the delivery robot according to the first embodiment after an obstacle is removed.

FIG. 3 is a perspective view illustrating delivery performed by a delivery robot after an obstacle is removed.

The control unit 100, after confirming by the sensor 18 that the human 2 has removed the obstacle 40, stops the delivery robot 10 in a left lateral position relative to the storage cabinet 30 as shown in FIG. 3. The delivery robot 10 can also stop as close as possible to the storage cabinet 30 so that the distance the telescopic arm has to extend is as short as possible. The control unit 100 of the delivery robot 10 then controls the telescopic arm 152 and the raising/lowering unit 151 based on information on the position of the storage cabinet 30 obtained from the sensor 18. This allows the loading platform 15 to store the article 20 in the target storage cabinet 30.

Figure 4:
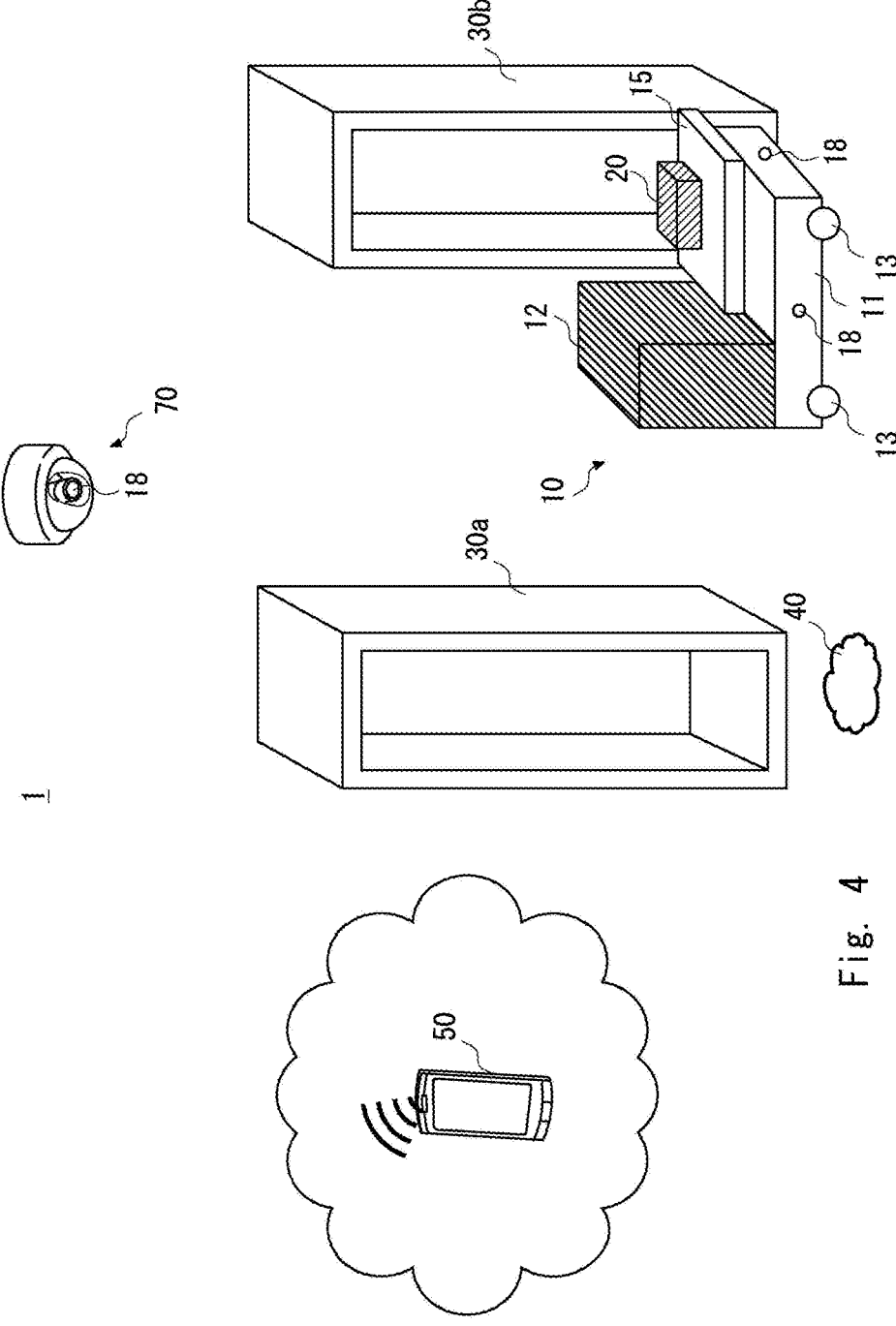
FIG. 4 is a perspective view illustrating a notification sent by the delivery robot according to the first embodiment to a communication terminal and the delivery robot delivering an article to another storage cabinet.

FIG. 4 is a perspective view illustrating a notification sent by a delivery robot to a communication terminal and the delivery robot delivering an article to another storage cabinet.

In FIG. 4, there is an obstacle 40 in front of the storage cabinet 30a. The control unit 100 of the delivery robot 10 detects the location of the obstacle 40 and the location of the storage cabinet 30a using the sensor 18. The control unit 100 cannot determine the location where delivery robot stops and the orientation of the delivery robot when it stops relative to the storage cabinet 30a based on the location of the obstacle and the location of the storage cabinet that have been detected. In this case, the control unit 100 can send a notification requesting that an obstacle be removed to a specific person (e.g., a recipient, family members of the recipient, a caretaker, neighbors, etc.) through the notification unit 17 of a communication terminal 50 belonging to the specific person, thereby requesting the specific person to remove the obstacle 40. In FIG. 4, the communication terminal 50 is depicted as a smartphone, but it is not limited to thereto, and any communication terminal which can send an audible or visual notification to a human of the presence of an obstacle may be used. In this case, the control unit 100 may send a notification to a human who is a specific person of the presence of an obstacle, along with the image of the obstacle captured by a detection unit such as a camera. Thus, a specific person (e.g., a caretaker) can confirm the location of the obstacle 40 present in front of the storage cabinet from the captured image of the obstacle 40 and immediately take action to remove the obstacle 40.

In this case, the control unit 100 may determine that the obstacle 40 will not be removed by the specific person in a short period of time and cause the delivery robot 10 to travel to another storage cabinet 30b for delivery of another article, as shown in FIG. 4. On the other hand, for example, the sensor 18 of the fixed surveillance camera 70 installed on the ceiling may monitor whether the obstacle 40 that was present in front of the storage cabinet 30a has been removed by human. If the obstacle 40 has been removed, the control unit 100 may send a notification to the delivery robot 10 to redelivery the article 20 to the storage cabinet 30a. This allows the delivery robot to efficiently make another delivery while the obstacle 40 is being removed by a specific person.

Figure 5:
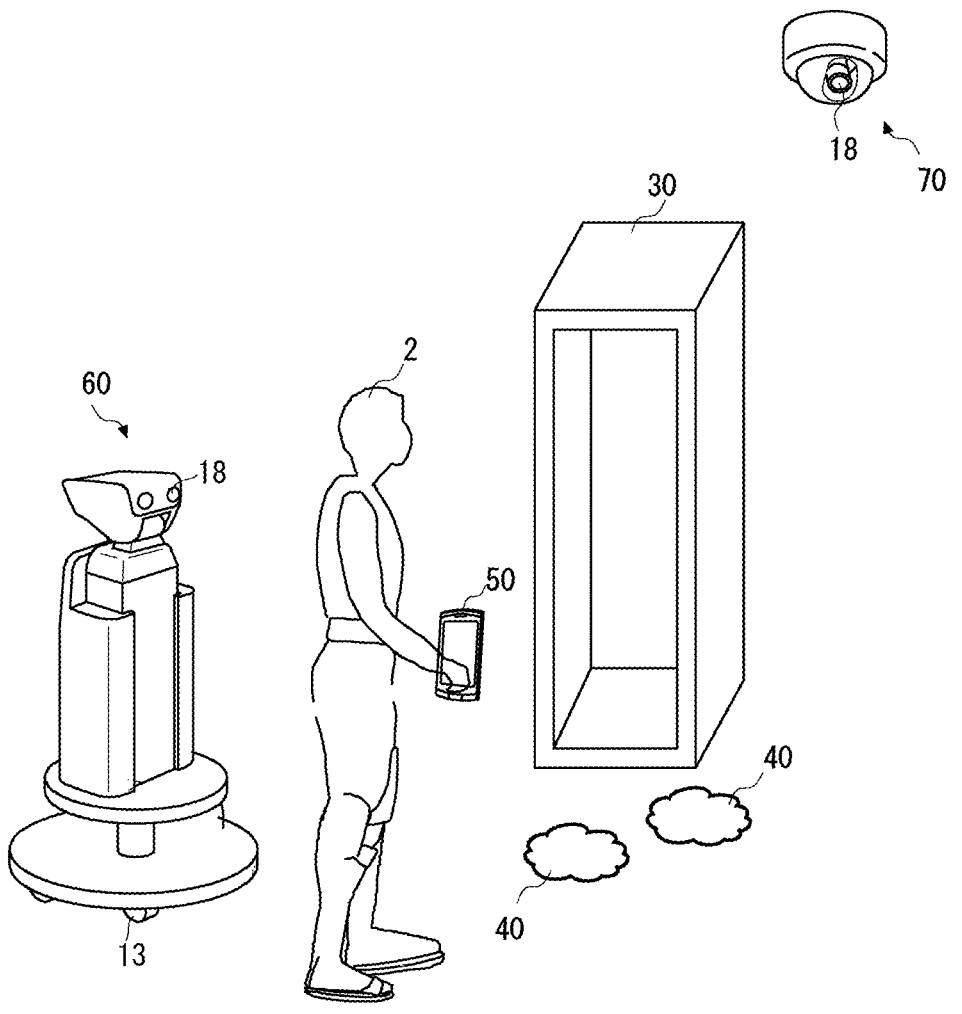
FIG. 5 is a perspective view illustrating an example in which an obstacle present in front of a storage cabinet is detected before the delivery robot according to the first embodiment arrives at the storage cabinet.

FIG. 5 is a perspective view illustrating an example in which a sensor detects an obstacle present in front of a storage cabinet before a delivery robot arrives at the storage cabinet.

In FIG. 5, there are two obstacles 40 in front of the storage cabinet 30. The control unit 100 of the management server detects the location of the two obstacles 40 and the location of the storage cabinet 30 using the sensor 18 of the patrol robot 60 or the sensor 18 of the fixed surveillance camera 70. The control unit 100 of the management server cannot determine the location where the delivery robot stops and the orientation of the delivery robot when it stops relative to a storage cabinet based on the location of the obstacle detected by the camera and the location of the storage cabinet. In this case, the control unit 100 may send a notification to the communication terminal 50 held by the human 2 who is a specific person requesting the human 2 to remove the obstacle 40 from a given area in front of the storage cabinet 30 before the delivery robot arrives. In this case, the control unit 100 may send a notification to the human 2 who is a specific person of the presence of an obstacle, along with the image of the obstacle captured by the sensor 18 which is a camera. Note that the patrol robot 60 may be a delivery robot for another delivery.

The human 2 who is a specific person, confirms the captured image through the communication terminal 50 and removes the two obstacles 40 from a given area in front of the storage cabinet 30. When the sensor 18 of the patrol robot 60 or the sensor 18 of the fixed surveillance camera 70 detects that the obstacles 40 have been removed, the control unit 100 of the management server can arrange for the delivery robot 10 to schedule delivery of an article to the storage cabinet 30. Thus, the delivery schedule of the delivery robot can be optimized by ensuring that an obstacle is removed before the delivery robot arrives at a storage cabinet.

A plurality of people may be sent a notification requesting that an obstacle be removed, and if a specific person actually removes the obstacle, incentives or rewards may be given to that specific person.

Second Embodiment

Figure 6:
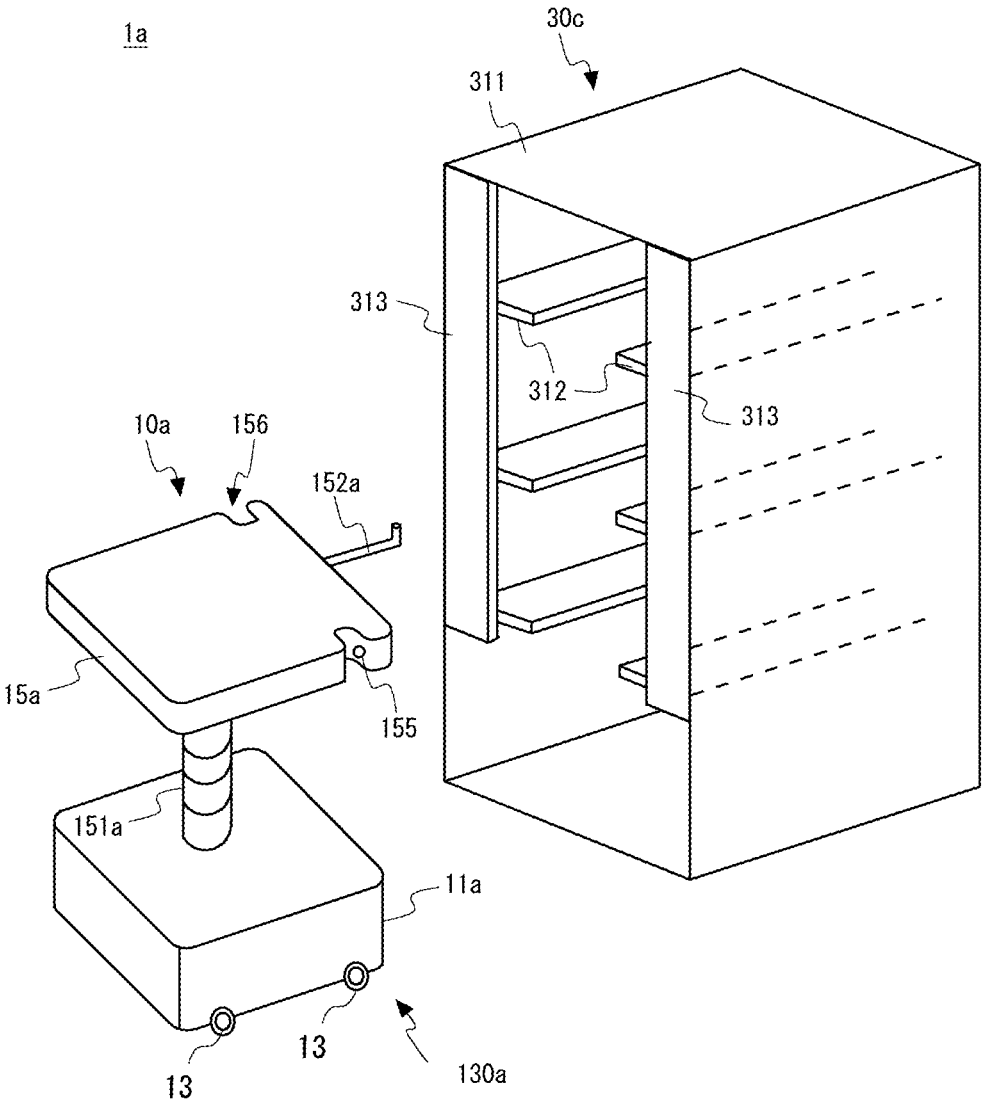
FIG. 6 is a schematic perspective view illustrating a delivery robot of a delivery system according to a second embodiment and a storage cabinet.

FIG. 6 is a diagram illustrating a delivery robot 10a and a storage cabinet 30c of a delivery system 1a. The delivery system 1a includes the storage cabinet 30c and the delivery robot 10a. The delivery robot 10 conveys an article to the storage cabinet 30 stores the article in the storage cabinet. The delivery robot 10a takes out an article from the storage cabinet 30c and convey the article it has taken out. Although not shown in FIG. 9, the delivery robot 10a may include the storage unit 12 as shown in FIG. 1. In addition, the storage cabinet 30c and the delivery robot 10a according to the second embodiment may include an engagement mechanism as described below to enable safe loading and unloading of an article. In FIG. 6, description of the same components as those in the first embodiment are omitted as appropriate.

The storage cabinet 30c accommodates an article (not shown). The article may be a returnable container, for example. The storage cabinet 30 includes a housing 311, a support member 312, and a guide rail 313. The support member 312 supports an article accommodated in the storage cabinet 30c.

The guide rail 313 engages with the groove 156 provided in the loading platform 15a of the delivery robot 10a. The guide rail 313 extends vertically. The guide rail 313 may be a plate-like member provided parallel to the front surface of the storage cabinet 30c. The plate-like member projects inward from the housing 311. The guide rail 313 may be provided on both right and left sides of the housing 311 or may be provided on either side of the housing.

The delivery robot 10a includes a loading platform 15a, a dolly unit 130a, a raising/lowering unit 151a, a telescopic arm 152a, and an engagement detection sensor 155. The loading platform 15a is a platform on which an article can be loaded and is also called a top plate. A groove 156 extending vertically is provided on the side surface of the loading platform 15a. When the loading platform 15a rises from the lower end due to the operation of the raising/lowering unit 151a, the groove 156 engages with the guide rail 313 of the storage cabinet 30c. The groove 156 may be provided on both the right and left sides of the side surface of the loading platform 15a.

The delivery robot 10a travels horizontally by the travelable dolly unit 130a. The raising/lowering unit 151a is provided on the dolly unit 130a. The raising/lowering unit 151a moves the loading platform 15a up and down. The telescopic arm 152a expands/contracts horizontally. The telescopic arm 152a takes an article from the storage cabinet 30c and places it on the loading platform 15a, and then stores the article placed on the loading platform 15a into the storage cabinet 30.

The engagement detection sensor 155 is provided in the groove 156. The engagement detection sensor 155 detects that the guide rail 313 and the groove 156 are engaged. When the guide rail 313 and the groove 156 are engaged, the guide rail 313 and the loading platform 15a are engaged. The engagement detection sensor 155 is, for example, a photointerrupter or a photoreflector. In this case, the engagement detection sensor 155 includes a light emitter and a light receiver. When the light from the light emitter is blocked by the guide rail 313, it may be detected that the guide rail 313 and the loading platform 15 are engaged. When the light from the light emitter is reflected by the guide rail 313, it may be detected that the guide rail 313 and the loading platform 15a are engaged. The engagement detection sensor 155 may be a sensor (e.g., contact sensors, magnetic sensors) for detecting the force received from the guide rail 313.

While a delivery system has been described in the above embodiments, the present disclosure is applicable to a delivery method using a component of the delivery system.

The program includes instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

It should be noted that the present disclosure is not limited to the above embodiments and may be modified accordingly to the extent that it does not deviate from the purpose.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A delivery system, comprising:
    a storage cabinet;
    a delivery robot configured to travel to the storage cabinet
        and deliver an article thereto;

at least one detection unit configured to detect an obstacle present in the vicinity of the storage cabinet; and a control unit configured to control an operation of the delivery system, including the delivery robot, wherein when the detection unit detects that there is an obstacle within a given area in the vicinity of the storage cabinet, and when the control unit determines that the delivery robot cannot deliver the article to the storage cabinet due to the presence of the obstacle, in response to the detection unit detecting a passerby, the control unit is configured to request the passerby to remove the obstacle from the given area, determine that the obstacle will be removed in a period of time, and put the delivery robot on standby until the detection unit detects that the obstacle has been removed, and in response to the detection unit detecting no passerby in the given area in the vicinity of the storage cabinet and in the vicinity of the delivery robot, the control unit is configured to send a notification to a communication terminal held by a specific person requesting the specific person to remove the obstacle, along with an image of the obstacle captured by the detection unit, determine that the obstacle will not be removed in the period of time, and cause the delivery robot to travel to another storage cabinet and deliver another article until removal of the obstacle is detected by the detection unit.

2. The delivery system according to claim 1, wherein when a detection unit different from the detection unit of the delivery robot detects that there is an obstacle in the given area in the vicinity of the storage cabinet, and when the control unit determines that the delivery robot cannot deliver the article to the storage cabinet due to the obstacle, the control unit is configured to send a notification to the communication terminal held by the specific person requesting the specific person to remove the detected obstacle from the given area.

3. The delivery system according to claim 1, wherein the detection unit comprises a first camera attached to the delivery robot and configured to detect (a) the storage cabinet, and (b) a distance from the delivery robot to the storage cabinet, and a second camera fixed to a position other than the delivery robot, the second camera being configured to detect (a) the given area in the vicinity of the storage cabinet and (b) the obstacle, and the control unit is configured to receive a first signal from the first camera and a second signal from the second camera.

4. The delivery system according to claim 3, wherein the second camera is installed on a patrol robot or another delivery robot for another delivery, and the patrol robot or another delivery robot is configured to communicate monitoring information to the delivery robot via a wireless network.

*    *    *    *    *